Figure 1:
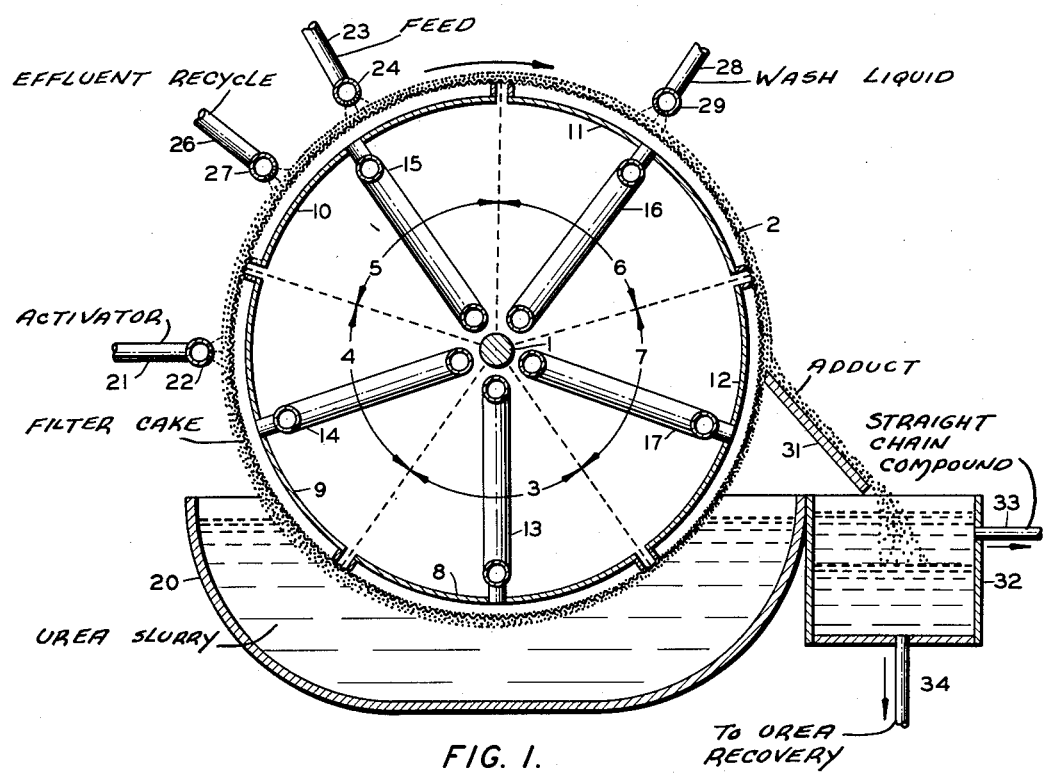

March 6, 1956

W. N. AXE 2,737,508

SEPARATION OF STRAIGHT-CHAIN COMPOUNDS
FROM BRANCHED-CHAIN COMPOUNDS

Filed April 10, 1950

INVENTOR.
W. N. AXE
BY Hudson & Young
ATTORNEYS

United States Patent Office 2,737,508
Patented Mar. 6, 1956

2,737,508

SEPARATION OF STRAIGHT-CHAIN COMPOUNDS FROM BRANCHED-CHAIN COMPOUNDS

William N. Axe, Bartlesville, Okla., assignor to Phillips Petroleum Company, a corporation of Delaware Application April 10, 1950, Serial No. 155,061

5 Claims. (Cl. 260—96.5)

This invention relates to a process for the separation of organic compounds. In one of its aspects, it relates to a process for the separation of a class of compounds characterized by straight carbon atom chains from admixture with another class of organic compounds characterized by branched carbon atom chains. In another of its aspects, this invention relates to a process for the separation of straight-chain aliphatic hydrocarbons from admixture with branched-chain aliphatic and/or with cyclic hydrocarbons.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B. P.: 125.6° C.) cannot be economically separated from 2,2,4-trimethylhexane (B. P.: 126.5° C.) because of the small difference in boiling points. Such a separation is often desirable as, for example, in a gasoline manufacturing process in order to improve the octane rating of the gasoline by removal of the low octane straight-chain hydrocarbons therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as bromine or sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling point of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethyl-hexane, isooctane or other branched-chain hydrocarbons irrespective of their boiling points. Also, straight-chain hydrocarbons can readily be separated from cyclic hydrocarbons such as benzene, toluene or the cycloparaffins irrespective of the boiling points of the various components of a mixture thereof. Despite the obvious advantages to be realized from the type of separation that the urea adduct reaction is capable of accomplishing, the reaction has largely remained a laboratory curiosity because of the lack of a feasible commercial separation process based upon such a reaction. Obviously, it would be very useful to possess a process which utilized this selective adduct forming property of urea to make a separation between straight-chain and branched-chain organic compounds and yet one which would be economical and easy to operate in a continuous manner without having to resort to expensive, laboratory-type batch operations.

It has now been found that a straight-chain organic compound can be separated from a branched-chain and/or a cyclic organic compound in a continuous, economical and easily operable process by forming a pre-coat or filter cake of crystalline urea on a filtering mechanism and then passing a mixture of said organic compounds to be separated through the pre-coat of urea. When operating in such manner, the straight-chain organic compound forms an adduct with the urea in the urea pre-coat or filter cake and the non-adduct forming organic compound passes through the urea pre-coat or filter cake thereby accomplishing a separation between the adduct and non-adduct forming organic compounds. When operating such a process, the urea-organic compound adduct can be readily washed free from any non-adduct forming organic material which may be contained in the pre-coat. Also, the adduct can be continuously formed without employing extensive batch-type equipment such as settling and reaction zones.

It has also been found that the urea pre-coat or filter cake formed upon the filtering surface of the filter apparatus can be readily and efficiently activated by causing a fine dispersion of a suitable activator, which is adapted to activate the urea so that it will more readily form the desired adduct, to contact the crystalline surface of the urea pre-coat or filter cake so that the urea is intimately and thoroughly contacted with the activator without causing coalescence or fusing of the urea crystals and without employing such large quantities of the activator which would contaminate the organic compounds being separated.

Thus, according to this invention, there is provided a process for the separation of a straight-chain organic compound from admixture with a branched-chain and/or cyclic organic compound which comprises disposing a body of crystalline urea in a filtration zone to form a continuous layer or filter cake of filtering medium therein, passing said mixture of organic compounds through the layer of urea, thereby forming in said layer an adduct of said straight-chain organic compound and of said urea, recovering the said adduct and decomposing it to liberate said straight-chain organic compound therefrom. Still according to this invention, there is provided a process for the separation of a straight-chain hydrocarbon from its admixture with a branched-chain and/or a cyclic hydrocarbon which comprises forming a filter cake of crystalline urea in a filtration zone, passing said mixture through said filter cake thereby forming a solid adduct between said straight-chain hydrocarbon and said urea which is retained on said filtering mechanism while permitting said branched-chain and/or cyclic hydrocarbon to pass therethrough, recovering said adduct and decomposing it to release the straight-chain hydrocarbons therefrom. Still further according to this invention, there is provided a process for the separation of a straight-chain organic compound from a branched-chain and/or cyclic organic compound which comprises forming a pre-coat or filter cake of crystalline urea in a filtration zone, contacting said urea filter cake with a finely dispersed activator, passing a mixture of said straight-chain and branched-chain and/or cyclic organic compounds through said urea filter cake, washing the thus formed adduct with a solvent for said branched-chain and/or cyclic organic compound, recovering the washed adduct and decomposing it by heating to liberate the straight-chain organic compound therefrom.

In order to even more fully set forth the process of this invention, it will be illustrated in a specific embodiment with particular reference to the attached diagrammatic drawing.

Figure 2:
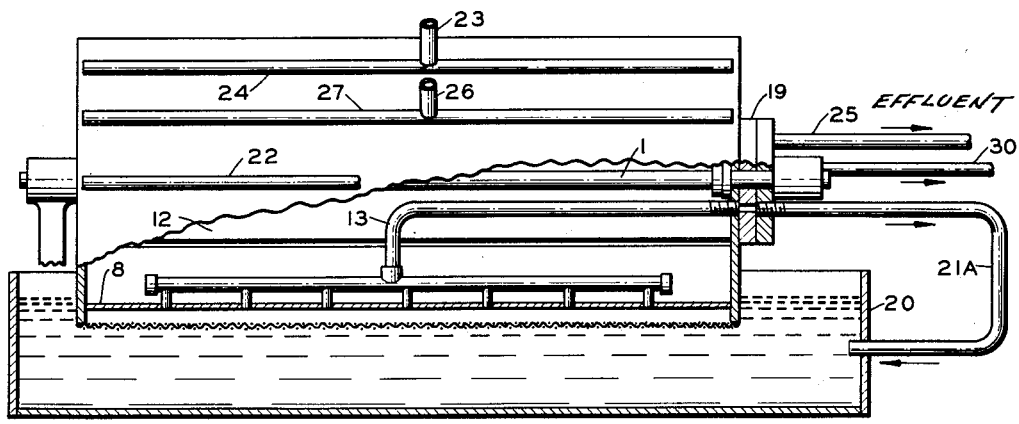

In the drawing, there is illustrated a rotary drum filter of a type well known to the art wherein it is called an Oliver filter. Figure 1 is a cross-sectional end view of the rotary filter while Figure 2 is a longitudinal elevation showing, in part, some of the features of internal construction of the rotary filter. The filter is constructed to rotate about horizontal axis 1 and has a cylindrical filter surface 2 which is divided circumferentially into a plurality of filtering segments 3, 4, 5, 6 and 7, as indicated by the dashed lines in Figure 1, by collectors 8, 9, 10, 11 and 12, respectively. The collectors are connected by conduits 13, 14, 15, 16 and 17, respectively, to a source of vacuum (not shown) through an automatic port valve 19 in a manner well known to the art. Other specific constructional features of such type filter are not shown since they are well known to the art and would merely encumber the present disclosure without aiding in the understanding of the invention. Also, though a rotary filter of the Oliver type is shown, it will be obvious from a consideration of the present disclosure that other types of filters, such as the rotary leaf, can be adapted to the process of this invention without the exercise of invention.

In operation, the rotary filter drum can be rotated in a clockwise direction through a suspension of crystalline urea in an inert and non-solvent liquid, such as pentane or isooctane, maintained in vat 20. Vacuum is applied through conduit 13 to collector 8 thereby causing a precoat or filter cake of urea crystals to form on segment 3 of filter surface 2. The crystalline urea should have such particle size as will permit ready passage of liquids through a filter cake thereof without excessive pressure drop. Ordinarily, a crystal size within the range of 5 to 150, preferably 40 to 80, standard mesh size is desirable. The thickness of the filter cake to be employed is governed by a number of factors such as the amount of adduct-forming organic compound in the material to be separated, the desired degree of separation, the size of the urea crystals, the rate at which the organic compounds are passed through the filter cake and others. Usually, a filter cake thickness can be within the range from 0.1 to 3 inches, preferably from 0.5 to 1 inch, in order to obtain satisfactory results. Any suspending liquid from vat 20 which is drawn into collector 8 during the formation of the urea filter cake on segment 3 is removed therefrom through conduit 13 and can be recirculated back to vat 20 via line 21A. Suitable agitation means, such as an impeller mixer (not shown), can be provided in vat 20 to maintain the crystalline urea adequately suspended therein.

Segment 4 of filter surface 2 has already had a filter cake of crystalline urea deposited upon it and, as the rotary filter rotates, it can be sprayed, if desired, with a finely dispersed activator, such as methanol, from line 21 and spray header 22. The activator should encounter the urea filter cake as a very fine mist which will enable an intimate and thorough contact with the crystalline surface of the urea filter cake with a minimum amount of activator to prevent any fusing of the urea crystals and to avoid any possible contamination of organic compound products with excess activator not removed from the filter cake. However, excess activator which may accumulate on the urea filter cake can be withdrawn therefrom by applying a vacuum through conduit 14 to collector 9.

Filter surface 2 of segment 5 has a filter cake of activated urea thereon. The admixture of organic compounds to be separated is sprayed by means of line 23 and spray header 24 onto the activated urea filter cake and is drawn therethrough by a vacuum applied through conduit 15 to collector 10. During the passage of the organic compounds through the activated urea filter cake, straight-chain organic compounds react with the urea to form an adduct which remains as a solid in the filter cake. The branched-chain or cylic organic compounds do not form adducts but pass through the filter cake into collector 10 from which they are withdrawn through conduit 15, port valve 19 and line 25. The rate at which the admixture of organic compounds is sprayed onto and passes into and/or through the filter cake depends upon a number of factors such as the ease with which the desired adduct is formed with any particular adduct-forming compound, the desired degree of separation, the thickness of the filter cake and others. Ordinarily, application of the admixture of organic compounds to the filter cake at a rate within the range of 0.1 to 5, preferably from 0.3 to 1, gallons per minute per square foot of urea filter cake area is satisfactory. In the instance that complete removal of straight-chain organic compounds has not been accomplished by a single pass through the urea filter cake, the effluent mixture of organic compounds in line 25 can be returned to line 23 to again be passed through the urea filter cake. Further, the organic compound mixture can be recirculated through lines 25 and 23 as many times as is necessary to accomplish the desired degree of purity, that is, freedom from adduct-forming compounds, of the material flowing through line 25.

As a feature of this invention, the organic compound effluent in line 25 is passed to line 26 and sprayed through spray header 27 onto the activated urea filter cake. In accordance with this particular feature, the recycled compounds from line 25 are contacted with the urea filter coat before it is contacted with the fresh feedstock passing through line 23 and spray header 24. In this manner, activated urea which is free from adducts and therefore has comparatively great adduct forming power is contacted with a mixture of organic compounds having a decreased concentration of a straight-chain organic compound before the fresh feedstock, containing an undiminished concentration of a straight-chain organic compound, is contacted with the urea filter cake. When employing this feature, collector 10 can be subdivided into two separate collectors having separate effluent lines (not shown) to avoid mixing the more pure compounds passing through the filter cake from line 26 with the less pure compounds passing through the filter cake from line 23.

Segment 6 of filter surface 2 has deposited on it the straight-chain organic compound-urea adduct, as well as any unreacted urea, and can be washed, if desired with a solvent sprayed thereon through line 28 and spray header 29. In passing through the filter cake, the solvent washes away any unreacted organic compounds thereby leaving only the urea adduct and any unreacted urea in the filter cake. The solvent and any dissolved organic compounds contained therein pass through collector 11 and out through conduit 16, port valve 19 and line 30. The solvent can then be recovered free from organic compounds washed from the urea filter cake and/or traces of activator by any suitable means, such as fractional distillation (not shown) and recycled to line 28 to reuse in the process.

At least part of the washed filter cake on segment 7 of filter surface 2 can be removed therefrom by scraper knife 31 and passed into vessel 32 which can contain water maintained at a temperature between 120 and 200° F., preferably between 130 and 160° F. Upon contact with the warm water, the urea adduct decomposes to yield urea and the straight-chain organic compound which was separated from admixture with other organic compounds in line 23. The straight-chain organic compound is removed from vessel 32 via line 33. The aqueous or heavier phase from vessel 32 is removed via line 34 for the recovery of urea and, if desired, the activator, both of which can be reused in the process. Alternatively, the washed filter cake removed by scraper knife 31 can be merely heated without the addition of water to a temperature within the range of 120 and 200° F., preferably 130 and 160° F., to decompose the adduct and to liberate the straight-chain organic compound therefrom.

The straight-chain organic compounds removed through line 33 are either a liquid or a solid and can be further refined to an even higher purity by treatment with a molar deficiency of urea for separation of a very pure straight-chain organic compound fraction.

The organic compounds which can be separated by the process of this invention are many and varied. Any straight-chain organic compound capable of forming a solid adduct with urea can be separated from its admixture with any other branched-chain or cyclic organic compound which does not form a solid adduct with urea. In determining whether any particular compound will or will not form an adduct, it is necessary to merely admix such compound with activated urea, agitate the admixture, separate the crystalline product from any remaining liquids and then decompose any adduct formed to readily determine whether the particular compound has formed an adduct. Obviously, such a determination is a matter of mere routine test and is well within the skill of the art. However, it has been found that a straight-chain organic compound which has a straight aliphatic carbon atom chain containing from six to fifty carbon atoms therein and which may have other substituents such as hydroxyl or a halogen radical attached to one of the two end carbon atoms can be separated from branched-chain or cyclic organic compounds according to the process of this invention. Thus, one or more of such straight-chain hydrocarbons as the paraffinic hydrocarbons containing from six to fifty carbons atoms, such as hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms such as the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes can be separated according to the process of this invention from admixture with one or more branched-chain hydrocarbons containing from three to fifty carbon atoms in the straight carbon atom chain portion of the molecule and also having one or more alkyl substituents therein ranging from one to fifty carbon atoms in length, such as, for example, methyl propane, the methyl butanes, dimethyl butane, the methyl pentanes, the ethyl pentanes, dimethyl and trimethyl pentane, diethyl pentane, the methyl hexanes, di-, tri- and tetramethyl hexane, the ethyl hexanes, di-, tri- and tetraethyl hexane, propyl hexane and other alkyl paraffins as well as methyl propane, the methyl butenes, di-, tri- and tetramethyl butenes, the methyl pentenes, the ethyl pentenes, dimethyl and trimethyl pentene, diethyl pentene and other alkyl olefins including the higher molecular weight alkyl olefins such as methyl, ethyl, propyl, butyl hexadecene and docosene and pentacontene. The aforementioned straight-chain hydrocarbons can likewise be separated from a mixture with one or more cyclic hydrocarbons such as cyclopropane, cyclobutane, cyclopentane, cyclohexane, cycloheptane, cyclooctane and other cycloparaffins up to and including such compounds as cyclodotriacontane and cyclotetratriacontane; the alkyl cycloparaffins such as methyl cyclopropane, ethylcyclopropane, methylpropylcyclopropane, methylcyclobutane, hexamethylcyclohexane, the cycloolefins such as ethyl cyclobutene, cyclopenten, cyclooctene and the alkyl cycloolefins such as methylcyclobutene, methylcyclopentene, dimethylisopropylcyclopentene, propylmethylcyclohexene. They can also be separated from cycloparaffins having unsaturated side-chains such as vinylcyclopropane, methylenecyclopropane, cyclopentylpropyne, methylpropylidenecyclohexane, methylenetetrapropylcyclohexane as well as from cycloolefins having unsaturated sidechains such as vinylcyclopentene, vinylcyclohexene, propenylcyclohexene, and trimethylallylcyclohexene. Still further, the straight-chain hydrocarbons can be separated from cyclodiolefins such as cyclopentadiene, methylhexadiene, cyclooctadiene, trimethylheptadiene; from cyclodiolefins with unsaturated sidechains such as isopropylidenecyclopentadiene; from cyclotrioolefins such as cycloheptatriene and cyclooctatriene; and from dicyclic hydrocarbons such as bicyclohexane, and bicyclooctane. Also, the straight-chain hydrocarbons can be separated from various aromatic hydrocarbons such as benzene, toluene, xylene, ethylbenzene, isopropylbenzene, methyldipropylbenzene, phenyldimethylbenzene, divinyl benzene, phenylbutadiene, napthalene, methylnaphthalene, diphenyl, octadecylnaphthalene, acenaphthene, phenanthrene, picene and such.

The process of this invention is also applicable to the separation of straight-chain alcohols having six to fifty carbon atoms such as hexanol, heptanol, octanol and undecanol, from branched-chain alcohols such as isopropanol, isobutanol, isopentanol, methyl hexanol, methylethyl octanol, and isooctanol.

The organic compound feed and the activated urea filter cake which it contacts should be maintained at a temperature below 90° F., that is between about 20 and 90° F., preferably between 45 and 80° F. and still more preferably at about room temperature, i. e. 70° F. The exact optimum temperature employed will depend largely upon the nature of the organic compounds being treated and can be readily determined by mere routine test. More highly viscous organic compounds should be treated at a higher temperature than the less viscous compounds in order to afford better contact with the urea filter cake.

A highly viscous or solid organic compound which can be passed through the urea filter cake only with great difficulty can be treated according to the process of this invention by dissolving or dispersing it in a solvent therefor. This solvent should be substantially inert to the activated urea and yet should readily dissolve the organic compounds to be separated. For example, in separating a straight-chain hydrocarbon wax from a branched-chain hydrocarbon wax, both of which are normally solid at the operating temperature of the process of this invention, the solid wax can be dissolved in a low boiling hydrocarbon, such as propane, butane or pentane, before being sprayed onto the activated urea filter cake. Other solvents which do not form adducts with urea also can be used. Amoung such solvents are branched-chain hydrocarbons having from three to twelve carbon atoms such as methyl propane, methyl butane and isooctane.

The activators which can be employed in the process of this invention should be selected from those compounds in which urea is quite soluble preferable from one of the lower boiling aliphatic alcohols having from one to five carbon atoms such as methanol, ethanol, and butanol. Water can also be used as well as other substances such as those ethers, ketones and esters in which urea is quite soluble. The amount of activator which is sprayed onto the urea filter cake should be sufficient to thoroughly wet the surfaces of the urea crystals yet insufficient to cause any substantially dissolution and washing away of the urea or any fusing together of the urea crystals. Accordingly, the activator, preferably methanol or ethanol, is sprayed as a fine mist onto the urea filter cake in such fashion that the mist-like droplets of activator effectively penetrate and contact all of the surfaces of the urea crystals without any substantial excessive accumulation of activator upon any particular crystalline surface.

The solvent which is sprayed through line 28 and spray header 29 onto the urea filter cake after it has been contacted with the mixture of organic compounds to be separated and the urea adducts have been formed, can be any type of solvent which will wash away or dissolve any non-adduct forming organic compound remaining in the filter cake and yet will not dissolve any substantial amounts of urea adduct or urea. Among such solvents can be mentioned the low boiling hydrocarbons containing from three to five carbon atoms such as propane, butane and pentane as well as low boiling branched-chain hydrocarbons such as methyl butane and dimethyl butane. It is preferred that isohexane or pentane be employed as the wash solvent where hydrocarbons are being separated according to the process of this invention since they have sufficient volatility to be readily distilled from the other hydrocarbons with which they may become admixed. The temperature of the wash solvent should be maintained below the decomposition temperature of the urea adducts and is preferably between 30 and 90° F., still more preferably between 50 and 75° F. The amount of solvent employed should be sufficient to accomplish the desired amount of washing of the of the urea adduct filter cake. The exact amount will depend upon a number of factors including the amount of material to be washed from the filter cake, the solvent power of the solvent for such material, the tenacity with which such material is held in the filter cake and the desired degree of purity of the washed filter cake. Ordinarily, an amount of wash solvent within the range of from 0.1 to 3, preferably from 0.2 to 1, gallons per square foot of filter cake surface is sufficient.

The process of this invention can be applied in many instances. Thus, gasoline containing normal paraffins can be treated according to the process of this invention to separate the low octane normal paraffins from the high octane branched-chain gasoline hydrocarbons and thereby increase the octane rating of the gasoline product. In such a process, the gasoline feed can be sprayed onto an activated urea filter cake in the manner described about at a temperature between 30 and 85° F. and at a rate between 0.1 and 0.6 gallon per minute per square foot of filter surface area. The hydrocarbon which passes through the urea filter cake without forming an adduct (i. e. principally branched-chain and cyclic hydrocarbons) will be of a substantially lessened straight-chain hydrocarbon content as compared to the original hydrocarbon feed.

A lubricating oil having an undesirably high pour point can be treated according to the process of this invention to decrease the pour point. For example, the high pour point lubricating oil is passed through the activated urea filter cake wherein the normal paraffinic waxy hydrocarbons react with the urea while the branched-chain non-waxy hydrocarbons pass through to yield a lubricating oil having a lower pour point. The high pour point lubricating oil feed can be diluted with a suitable solvent, such as propane, butane or pentane, in order to lower its viscosity sufficiently to permit ready passage through the urea filter cake. The amount of diluent solvent should range from about 0.2 to 1 gallon per gallon of lubricating oil.

A notable advantage of the present invention is that petroleum fractions having much lower pour points than those obtainable in conventional dewaxing procedures are readily obtained. Furthermore, in conventional dewaxing processes, waxes are frequently obtained that are rather difficult to separate by filtration. In the process of this invention, however, the filter is first coated with crystalline urea, which is relatively easy to remove by filtration, and the waxes or other normal paraffinic materials are deposited on the filter in the form of crystalline adducts which are easily filtered and washed.

The invention can be applied in numerous other instances where it is desired to separate one class of organic compounds from another including the treatment of kerosene to recover normal paraffinic hydrocarbons which have desirable burning properties; the treatment of jet fuels to meet pour point specifications; and the treatment of gas oils for the purpose of recovering a paraffinic fraction which is a desirable cracking stock and a non-paraffinic fraction which can be used for the production of carbon black.

The term "straight-chain" organic compound is employed herein in its ordinary meaning, that is, a compound having all of its carbon atoms attached to no more than two other carbon atoms. A "branched-chain" organic compound is meant to include, as is common, compounds having carbon atoms which are attached to more than two other carbon atoms.

While the invention has been described in connection with present, preferred embodiments thereof, it is to be understood that this description is illustrative only and is not intended to limit the invention, the scope of which is defined by the appended claims.

I claim:

1. The process for separating organic aliphatic straight-carbon atom chain material containing from 6 to 50 carbon atoms per molecule from admixture with an organic liquid containing branched-carbon atom chain organic material which comprises forming a filter cake of crystalline urea from a suspension of urea crystals having a size in the range of 40 to 80 standard mesh in an inert non-solvent liquid; spraying said filter cake in a first spraying step with a sufficient amount of finely dispersed activator comprising an alcohol containing from 1 to 5 carbon atoms per molecule so as to wet the surfaces of said urea crystals, thereby activating said urea; spraying said filter cake in a second spraying step with an effluent recycle liquid hereinafter described; spraying said filter cake in a third spraying step with said organic liquid containing said straight-chain and branched-chain organic materials at a temperature below 90° F. whereby a solid adduct is formed between said activated urea and the major portion of said straight-chain organic material which adduct is retained as part of said filter cake while said organic liquid containing branched-chain material and a minor portion of straight-chain organic material is permitted to pass through said filter cake without forming an adduct with urea; recovering said organic liquid which passes through said filter cake and returning said liquid as said effluent recycle for said hereinbefore referred to second spraying step whereby straight-chain organic materials therein form solid adducts; spraying said filter cake in a fourth spraying step with a hydrocarbon containing from 3 to 5 carbon atoms per molecule at a rate and in an amount sufficient to wash any unreacted organic compounds from said filter cake; removing said filter cake comprising said solid adduct to a decomposition zone; and decomposing said adduct so as to liberate said urea and said straight-chain organic material.

2. The process of claim 1 wherein the organic liquid is motor fuel.

3. The process of claim 2 wherein the aliphatic straight-carbon atom chain compound forming said solid adduct comprises a mixture of n-hexane, n-heptane and n-octane.

4. The process of claim 1 wherein the organic liquid contains a mixture of straight-chain and branched-chain alcohols.

5. The process of claim 1 wherein the organic liquid contains a mixture of straight-chain and branched chain hydrocarbons.

References Cited in the file of this patent

UNITED STATES PATENTS

| 1,948,565 | Day | Feb. 27, 1934 |
| 2,326,294 | Gee | Aug. 10, 1943 |
| 2,375,560 | Hutchinson et al. | May 8, 1945 |
| 2,487,796 | Evans | Nov. 15, 1949 |
| 2,518,677 | Garner et al. | Aug. 15, 1950 |
| 2,520,715 | Fetterly | Aug. 29, 1950 |
| 2,520,716 | Fetterly | Aug. 29, 1950 |
| 2,606,140 | Arnold et al. | Aug. 5, 1952 |
| 2,642,422 | Gorin | June 16, 1953 |

FOREIGN PATENTS

| 339,636 | Great Britain | Dec. 8, 1930 |